(12) United States Patent
Files et al.

(10) Patent No.: US 10,476,307 B2
(45) Date of Patent: Nov. 12, 2019

(54) WIRELESS POWER SYSTEM WITH FOREIGN OBJECT DETECTION AND METHOD THEREFOR

(71) Applicant: DELL PRODUCTS, LP, Round Rock, TX (US)

(72) Inventors: Jace W. Files, Round Rock, TX (US); Vinh Xuan Bui, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 128 days.

(21) Appl. No.: 15/457,858

(22) Filed: Mar. 13, 2017

(65) Prior Publication Data

US 2018/0262047 A1 Sep. 13, 2018

(51) Int. Cl.
*H02J 50/12* (2016.01)
*H02J 7/02* (2016.01)
*H02J 50/20* (2016.01)
*H02J 50/60* (2016.01)
*H02J 50/90* (2016.01)
*H02J 50/80* (2016.01)

(52) U.S. Cl.
CPC .............. *H02J 50/12* (2016.02); *H02J 7/025* (2013.01); *H02J 50/20* (2016.02); *H02J 50/60* (2016.02); *H02J 50/80* (2016.02); *H02J 50/90* (2016.02)

(58) Field of Classification Search
CPC .. H02J 50/12; H02J 7/025; H02J 50/80; H02J 50/20; H02J 50/90; H02J 50/60
See application file for complete search history.

(56) References Cited

U.S. PATENT DOCUMENTS

| | | |
|---|---|---|
| 3,555,187 A | 1/1971 | Rowley |
| 5,528,424 A | 6/1996 | Lentz et al. |
| 5,545,966 A | 8/1996 | Ramos et al. |
| 5,852,903 A | 12/1998 | Astrizky |
| 6,381,135 B1 | 4/2002 | Prasher et al. |
| 6,396,241 B1 | 4/2002 | Ramos et al. |
| 8,766,484 B2 | 7/2014 | Baarman et al. |
| 8,917,511 B2 | 7/2014 | Yamamoto et al. |
| 9,451,723 B2 | 9/2016 | Lofy et al. |
| 9,592,397 B2 | 3/2017 | Hansen et al. |
| 9,729,204 B2 * | 8/2017 | Kozakai ................. H02J 5/005 |
| 2002/0050934 A1 | 5/2002 | Olodort et al. |
| 2002/0068522 A1 | 6/2002 | Dixon |
| 2002/0109936 A1 | 8/2002 | Korbel et al. |
| 2003/0086829 A1 | 5/2003 | Livesay et al. |
| 2004/0139571 A1 | 7/2004 | Chang et al. |
| 2005/0013137 A1 | 1/2005 | Burton, Jr. |
| 2006/0162627 A1 | 7/2006 | Alger |
| 2007/0021271 A1 | 1/2007 | Held |

(Continued)

OTHER PUBLICATIONS

"Dell Mobile Computing Cart," Dell Quick Reference Guide for Models ERGITD-001 and ERGITD-002, Mar. 2014, pp. 1-13, http://www.ergotron.com/Dell.

(Continued)

*Primary Examiner* — Jared Fureman
*Assistant Examiner* — Duc M Pham
(74) *Attorney, Agent, or Firm* — Larson Newman, LLP

(57) ABSTRACT

A method includes establishing mutual communication between a wireless power transmitting unit (PTU) and a wireless power receiving unit (PRU); and receiving at the wireless PTU impedance range information from the wireless PRU.

20 Claims, 9 Drawing Sheets

(56) References Cited

U.S. PATENT DOCUMENTS

| | | |
|---|---|---|
| 2007/0049071 A1 | 3/2007 | Jackson et al. |
| 2007/0244530 A1 | 10/2007 | Ren |
| 2008/0013137 A1 | 1/2008 | Itoh |
| 2008/0078530 A1 | 4/2008 | Chang et al. |
| 2008/0079388 A1 | 4/2008 | Samowsky et al. |
| 2008/0111518 A1 | 5/2008 | Toya |
| 2009/0044934 A1 | 2/2009 | Malkov |
| 2009/0096413 A1 | 4/2009 | Partovi et al. |
| 2009/0105493 A1 | 4/2009 | Jang et al. |
| 2009/0212637 A1 | 8/2009 | Baarman et al. |
| 2009/0212737 A1 | 8/2009 | Johnson et al. |
| 2010/0019614 A1 | 1/2010 | Arend et al. |
| 2010/0132410 A1 | 6/2010 | Nypelö et al. |
| 2010/0245721 A1 | 9/2010 | Chang et al. |
| 2011/0050164 A1 | 3/2011 | Partovi et al. |
| 2011/0057891 A1 | 3/2011 | Ham et al. |
| 2011/0115350 A1 | 5/2011 | Tsai et al. |
| 2011/0193524 A1 | 8/2011 | Hazzard et al. |
| 2012/0001496 A1 | 1/2012 | Yamamoto et al. |
| 2012/0113576 A1 | 2/2012 | Cooper et al. |
| 2012/0062175 A1 | 3/2012 | Miller et al. |
| 2012/0087074 A1 | 4/2012 | Chen |
| 2012/0105177 A1 | 5/2012 | McLaren et al. |
| 2012/0149291 A1 | 6/2012 | Roderick et al. |
| 2012/0256585 A1 | 10/2012 | Partovi et al. |
| 2013/0038280 A1 | 2/2013 | Boundy et al. |
| 2013/0058023 A1 | 3/2013 | Supran et al. |
| 2013/0088192 A1 | 4/2013 | Eaton |
| 2013/0119926 A1 | 5/2013 | Lin |
| 2013/0141037 A1 | 6/2013 | Jenwatanavet et al. |
| 2013/0162220 A1 | 6/2013 | Iijima et al. |
| 2013/0192653 A1 | 8/2013 | Watson et al. |
| 2013/0214612 A1 | 8/2013 | Bae |
| 2013/0223826 A1 | 8/2013 | Bruce et al. |
| 2013/0278207 A1 | 10/2013 | Yoo |
| 2013/0300204 A1 | 11/2013 | Partovi |
| 2013/0311798 A1 | 11/2013 | Sultenfuss et al. |
| 2013/0330663 A1 | 12/2013 | Kawasaki et al. |
| 2014/0002014 A1 | 1/2014 | Sultenfuss et al. |
| 2014/0031606 A1 | 1/2014 | Hansen et al. |
| 2014/0062392 A1 | 3/2014 | Lofy et al. |
| 2014/0115766 A1 | 5/2014 | Muderlak et al. |
| 2014/0125276 A1 | 5/2014 | Lampinen |
| 2014/0132210 A1 | 5/2014 | Partovi |
| 2014/0152099 A1 | 6/2014 | Boyd |
| 2014/0152244 A1 | 6/2014 | Rautiainen |
| 2014/0159656 A1 | 6/2014 | Reihl |
| 2014/0177197 A1 | 6/2014 | Lampinen |
| 2014/0184155 A1 | 7/2014 | Cha |
| 2014/0191568 A1 | 7/2014 | Partovi |
| 2014/0197784 A1 | 7/2014 | Boldt |
| 2014/0209691 A1 | 7/2014 | Finn et al. |
| 2014/0225560 A1 | 8/2014 | Walley et al. |
| 2014/0226795 A1 | 8/2014 | Kitano |
| 2014/0231973 A1 | 8/2014 | Huang et al. |
| 2014/0266025 A1 | 9/2014 | Jakubowski |
| 2014/0266624 A1 | 9/2014 | Van Bosch et al. |
| 2014/0306654 A1 | 10/2014 | Partovi |
| 2014/0333256 A1 | 11/2014 | Widmer et al. |
| 2014/0339911 A1 | 11/2014 | Abe |
| 2014/0354220 A1 | 12/2014 | Liu |
| 2015/0002103 A1 | 1/2015 | Tomiki et al. |
| 2015/0202656 A1 | 7/2015 | Takahashi et al. |
| 2015/0222017 A1 | 8/2015 | Kumura et al. |
| 2015/0244182 A1 | 8/2015 | Ozana et al. |
| 2015/0284288 A1 | 10/2015 | Ellison et al. |
| 2015/0326060 A1 | 11/2015 | Young |
| 2015/0364928 A1 | 12/2015 | Yen et al. |
| 2016/0103071 A1 | 4/2016 | Wincheski et al. |
| 2016/0159233 A1 | 6/2016 | Kim |
| 2016/0216301 A1* | 7/2016 | Holzworth ............. G01R 27/16 |
| 2016/0254694 A1 | 9/2016 | Peterson et al. |
| 2016/0344195 A1 | 11/2016 | Xu et al. |
| 2016/0372948 A1 | 12/2016 | Kvols |
| 2017/0063142 A1 | 3/2017 | Loewen |
| 2017/0117751 A1* | 4/2017 | Karnstedt ............... H02J 50/12 |
| 2017/0324351 A1* | 11/2017 | Rochford ............. H04B 5/0081 |
| 2018/0191206 A1* | 7/2018 | Bronson ................ H02J 50/80 |
| 2018/0219524 A1* | 8/2018 | Govindaraj ............. H03H 7/38 |

OTHER PUBLICATIONS

"Dell Mobile Computing Cart-Managed (with Docking) Docking solution for Dell Latitude 3340," Dell Quick Reference Guide, Mar. 2014, pp. 1-10, http://www.ergotron.com/Dell.

"Dell Mobile Computing Cart," Dell Quick Reference Guide for Models ERGITD-001 and ERGITD-002 Rev. B, Oct. 2013, pp. 1-13, http://www.ergotron.com/Dell.

"Lenovo Yoga Tablet review," Pierce, David, Nov. 12, 2013, pp. 1-8, https://www.theverge.com/2013/11/12/5090560/lenovo-yoga-tablet-8-10-review.

* cited by examiner

WIRELESS POWER SYSTEM WITH FOREIGN OBJECT DETECTION AND METHOD THEREFOR

CROSS REFERENCE TO RELATED APPLICATIONS

Related subject matter is contained in co-pending U.S. patent application Ser. No. 15/457,867 entitled "Wireless Power System with Device Specific Power Configuration and Method Therefor," filed on Mar. 13, 2017, the disclosure of which is hereby incorporated by reference.

Related subject matter is contained in co-pending U.S. patent application Ser. No. 15/457,872 entitled "Thermal Management at a Wireless Power System," filed on Mar. 13, 2017, the disclosure of which is hereby incorporated by reference.

FIELD OF THE DISCLOSURE

The present disclosure generally relates to information handling systems, and more particularly relates to a wireless power system with foreign object detection.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system can include circuitry to facilitate receiving power wirelessly. A wireless power delivery system typically includes a wireless charging pad on to which the information handling system can be placed. The wireless power delivery system can charge a battery included at the information handling system, or provide operational power. The information handling system can communicate with the wireless charging pad to indicate that the device is available to receive power. The wireless power delivery system can then wirelessly transmit power to the device.

A method includes establishing mutual communication between a wireless power transmitting unit (PTU) and a wireless power receiving unit (PRU); and receiving at the wireless PTU impedance range information from the wireless PRU.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
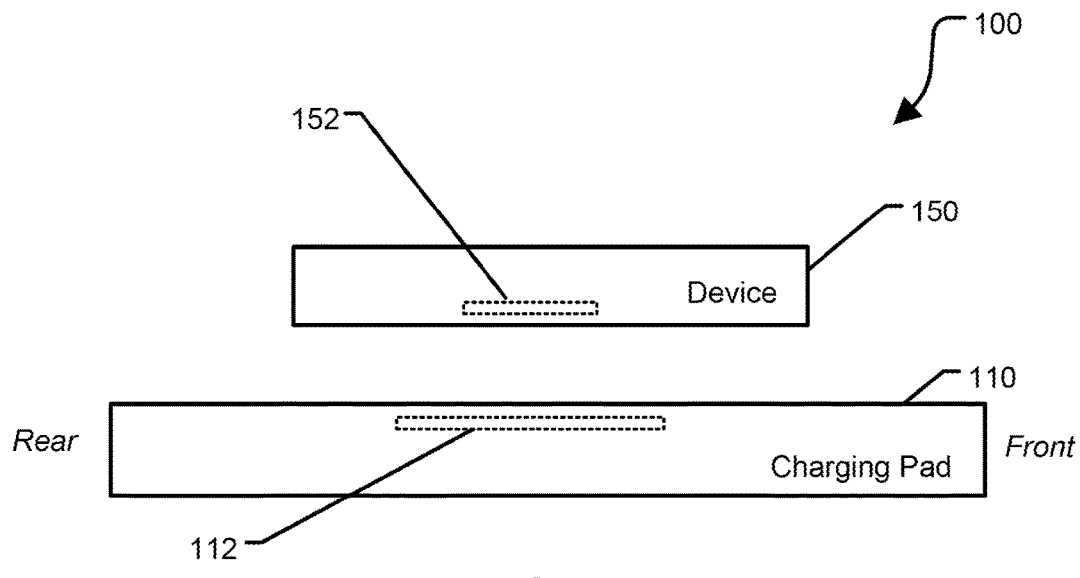
FIG. 1 is a block diagram of a wireless power delivery system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

FIGS. 1-10 illustrate techniques for providing power to an information handling system without the use of a physical power cable. A wireless power system includes a power transmitting device, such as a charging pad. The power transmitting device includes a high-frequency signal generator that drives a resonator coil included in the transmitting device. An information handling system that is receiving power includes a complementary resonator coil. During operation, energy from the power transmitting device is wirelessly coupled from the transmitter resonator to the resonator included in the information handling system. The transmitted power can be used to charge a battery included at the information handling system or to provide operating power to the information handling system. Because the wireless power system employs electromagnetic radiation to couple energy to the device that is receiving power, there exists the potential for a foreign object located proximate to the transmitter resonator to absorb a portion of the transmitted power. Techniques are disclosed herein for mitigating this problem. In particular, an information handling system can communicate impedance information to the power transmitting device. The impedance information specifies a load presented to the power transmitting device when the resonator at the information handling system is properly coupled to the transmitter resonator. If a transmitter load impedance is outside a range specified by the impedance information supplied by the information handling system, possibly indicating presence of a foreign object, the power transmitting device can interrupt power transmission.

The amplitude of the electromagnetic radiation generated by the wireless power transmitter is regulated to prevent potentially harm to users of the system unless. The power regulation is typically engineered to include substantial guard banding in order to insure safe operation and compliance with government regulations. Techniques are disclosed herein for safely increasing the transmitted power by characterizing an amount of electromagnetic shielding of the transmitter radiation that is provided by the device that is receiving power. In particular, a device that is receiving power can communicate information identifying the device to the wireless power transmitter. In response, the transmitter can adjust the level of transmitted energy based on characterization data corresponding to the device.

The efficiency at which the wireless power transmitter can provide power to the receiving device is affected by a mutual coupling of the transmitter's resonator with the receiver's resonator. Poor coupling can result in excessive heating of the device receiving power. Techniques are disclosed herein for determining the coupling based on a rectified voltage received from the receiver's resonator. If the coupling between the receiver and transmitter is determined to be below a threshold, the level of power transmission can be reduced, thereby minimizing the undesired heating of the information handling system. Many of the concepts disclosed herein can be applied to any class of wireless power transmission system, including resonant, inductive, and the like.

FIG. 1 shows a wireless power delivery system 100 according to a specific embodiment of the present disclosure. Wireless power delivery system 100 includes a wireless charging pad 110 and an information handling systems 150. Wireless charging pad 110 includes a power transmitter unit (PTU) 112, and information handling system 150 includes a power receiver unit (PRU) 152. PTU 112 can include resonator circuitry, control circuitry, communication circuitry (not shown at FIG. 1). The resonator includes an inductor, which is typically a planar coil of wire. PRU 152 can include resonator circuitry, control circuitry, communication circuitry, and the like (not shown at FIG. 1). PTU 112 and PRU 152 can include additional components, such as memory devices, to support the techniques disclosed herein. During operation, information handling system 150 is placed onto the surface of charging pad 110. Wireless charging pad 110 can identify the presence of system 150 by energizing the PTU resonator to generate a sequence of low-power pulses, known as a beacon sequence. The beacon sequence transmits enough power to the energize PRU 152. PRU 152 can respond to the beacon by initiating data communication with PTU 112 and exchanging information to facilitate the transmission of power. Data communication between PTU 112 and PRU 152 can be provided using low-energy Bluetooth network technology or another wireless communication technology. Information handling system 150 can monitor its current operating conditions and control a rate of power transmission. For example, information handling system 150 can communicate with charging pad 110 using the data communication channel to regulate power transmission levels.

For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 2:
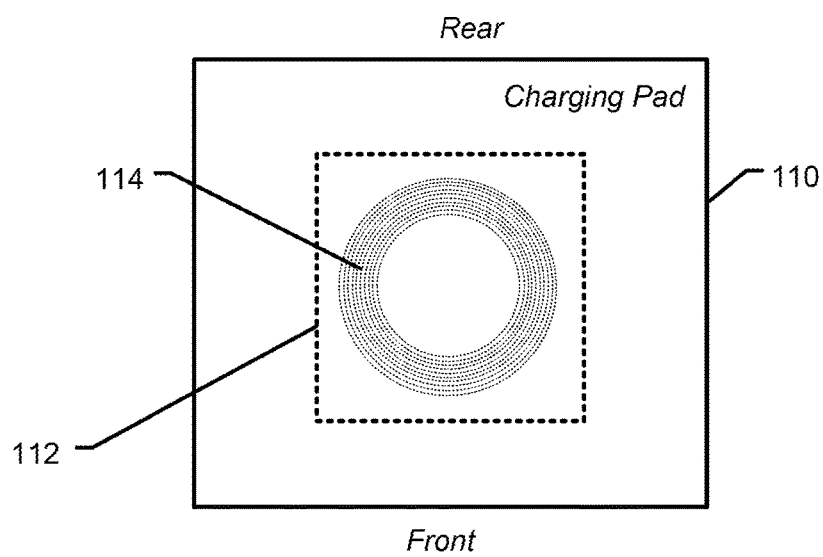
FIG. 2 is a block diagram of a charging pad according to a specific embodiment of the present disclosure.

FIG. 2 shows charging pad 110 of FIG. 1 as viewed from the top, according to a specific embodiment of the present disclosure. Charging pad 110 include an inductor 114, also referred to as an antenna. Inductor 114 is energized at a radio-frequency to generate an electromagnetic field that extends outward from the surface of charging pad 110. A device that is to receive power from charging pad 110 (not shown at FIG. 2) can be placed onto the surface of pad 110, so that the electromagnetic field generated by inductor 114 encompasses a corresponding inductor included at the device. In one embodiment of the present disclosure, charging pad 110 can determine whether a foreign object, e.g. an item that is not intended to receive power, has been inadvertently placed onto pad 110, or is otherwise within close-enough proximity to pad 110 to absorb power provided by charging pad 110. Presence of a foreign object in close vicinity to charging pad 110 can reduce an amount of power provided to information handling system 150. Furthermore, some foreign objects, such as radio-frequency identification (RFID) devices can be damaged if placed within a minimum proximity of charging pad 110.

Figure 3:
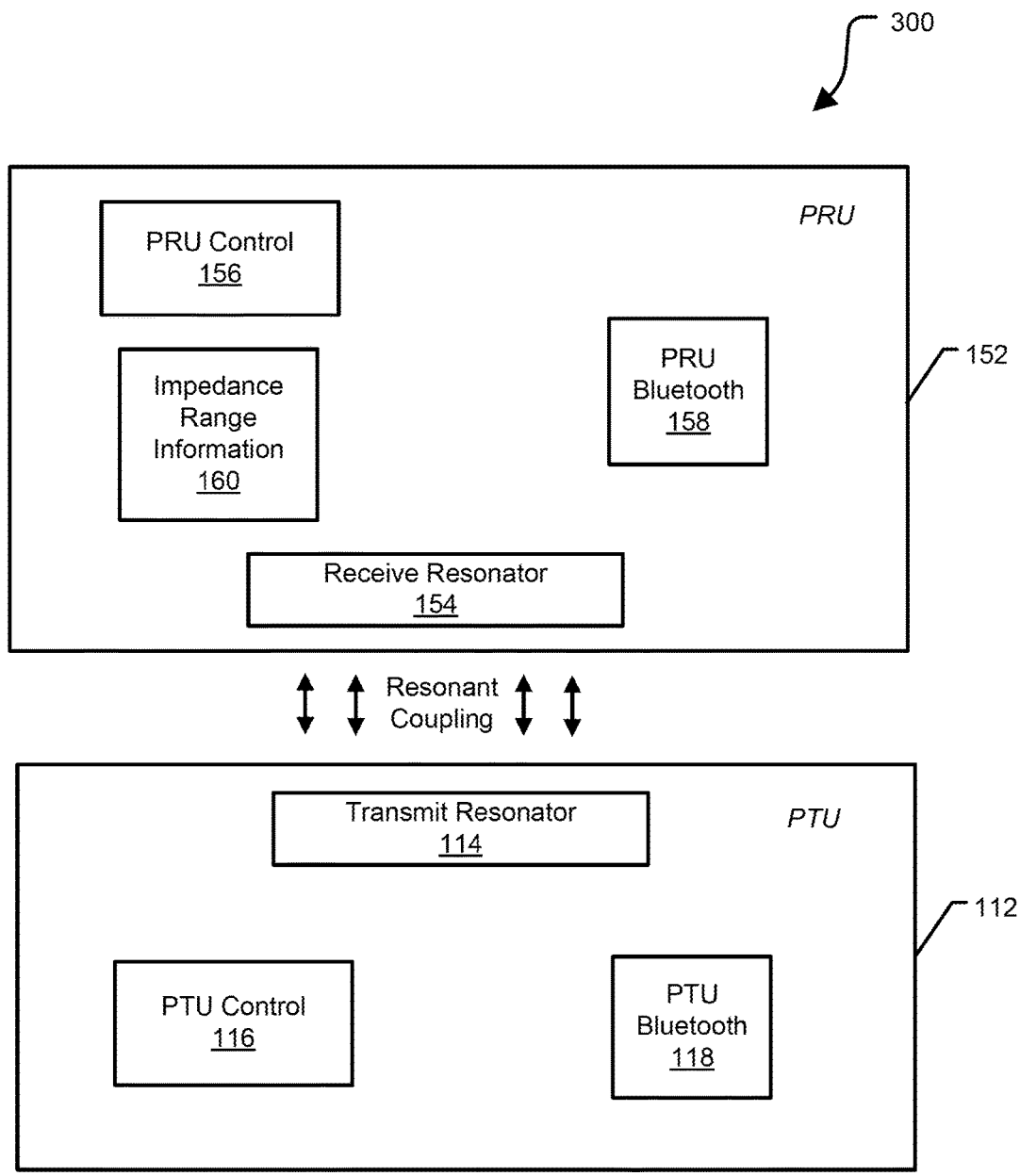
FIG. 3 is a block diagram illustrating a wireless charging system according to a specific embodiment of the present disclosure.

FIG. 3 shows a wireless charging system 300 according to a specific embodiment of the present disclosure. Wireless charging system 300 includes PTU 112 and PRU 152. PTU 112 includes transmit resonator 114, PTU control circuitry 116, and PTU Bluetooth circuitry 118. PRU 152 includes receiver resonator 154, PRU control circuitry 156, PRU Bluetooth circuitry 158, and device impedance range information 160. PRU 152 has a specific impedance range that is determined by a configuration of receiver resonator 154. Impedance range information 160 can be determined empirically through testing of information handling system 150. Impedance range information 160 as determined by the testing can be stored at a memory device included at information handling system 150. For example, impedance range information 160 can be stored at a memory device included at PRU 152, at a memory device associated with an embedded controller included in system 150, or at another memory device accessible to PRU 152. Impedance range information 160 can include a two-dimensional representation of real and imaginary resistance values.

During operation, and in particular during an initial pairing of PRU 152 with PTU 112, PTU 112 can access or otherwise be provided with impedance range information 160 using the communication link provided by PTU Bluetooth 118 and PRU Bluetooth 158. PTU 112 can determine whether a load impedance presently measured by PTU 112 falls within a range of impedance values specified by impedance range information 160. If PTU 112 determines that the measured load impedance falls within the range of impedance values provided by impedance range information 160, wireless power transmission can continue. If however PTU 112 determines that the measured load impedance does not fall within the range of impedance values provided by impedance range information 160, this condition may be due to a foreign object in proximity to charging pad 110, and PTU 112 can terminate power transmission by de-energizing transmit resonator 114. In response to terminating power transmission, an indicator at charging pad 110 can be illuminated to alert a user of the foreign object detection event. A record of the event can be entered in a log file maintained at charging pad 110, and the log file can be communicated to information handling system 150.

Figure 4:
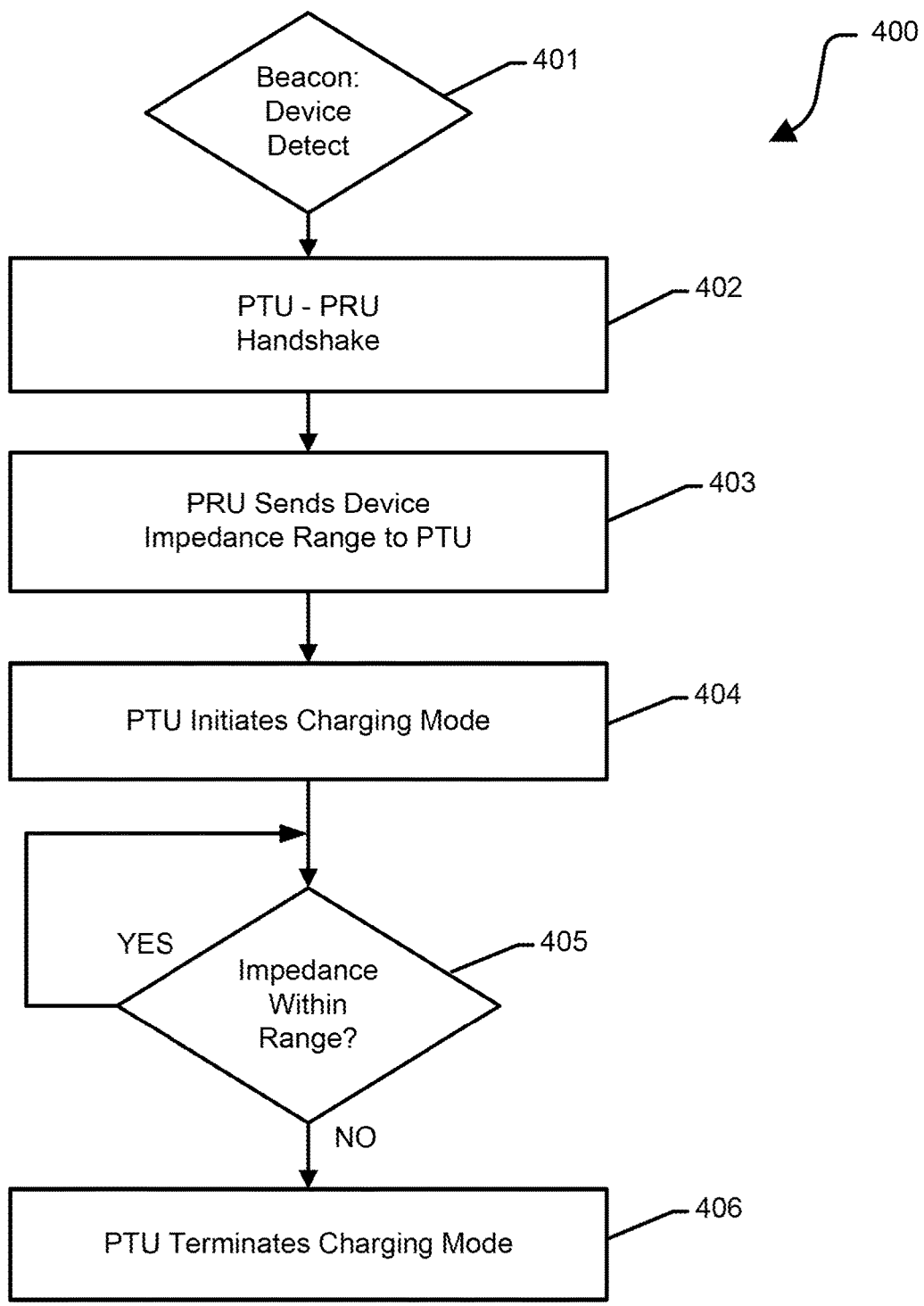
FIG. 4 is a flow diagram illustrating a method for detecting a foreign object in proximity to a wireless charging device according to a specific embodiment of the present disclosure.

FIG. 4 shows a method 400 for detecting a foreign object in proximity to a wireless charging device according to a specific embodiment of the present disclosure. Method 400 begins at block 401 where a device operable to receive wireless power is detected within range of a wireless power transmission device in response to a beacon protocol performed by the transmission device. For example, wireless charging pad 110 can momentarily activate transmit resonator 114, causing information handling system 150 to respond. The method continues at block 402 where a PTU at the wireless power transmission device and a PRU at the device operable to receive wireless power communicate via a wireless data communication circuitry. For example, PRU 152 can acknowledge reception of a beacon sequence received from PTU 112 using Bluetooth circuitry 158. Data and configuration settings can be exchanged between PRU 152 and PTU 112 according to protocols of a corresponding wireless power system specification under which PRU 152 and PTU 112 are defined.

Method 400 proceeds to block 403 where the PRU sends device impedance range information to the PTU. For example, PRU 152 can access device impedance range information 160 from a memory device at information handling system 150 and transmit the information to PTU 112 via the Bluetooth communication interface. At block 404, PTU 112 can initiate power transmission and measure a load impedance of PRU resonator 154 as seen by PTU 112. At decision block 405, PTU 112 can determine whether the measured load impedance falls within the range specified by impedance range information 160 received from PRU 152. If the measured load impedance is within the specified range, power transmission can continue. If however the load impedance measured by PTU 112 is not with the specified range, method 400 proceeds to block 406 where PTU 112 can terminate power transmission. If a load impedance seen by PTU 112 is not within the acceptable range specified by impedance range information 160 received from PRU 152, there is a possibility that a foreign object is located within the electromagnetic field produced by PTU resonator 114.

Figure 5:
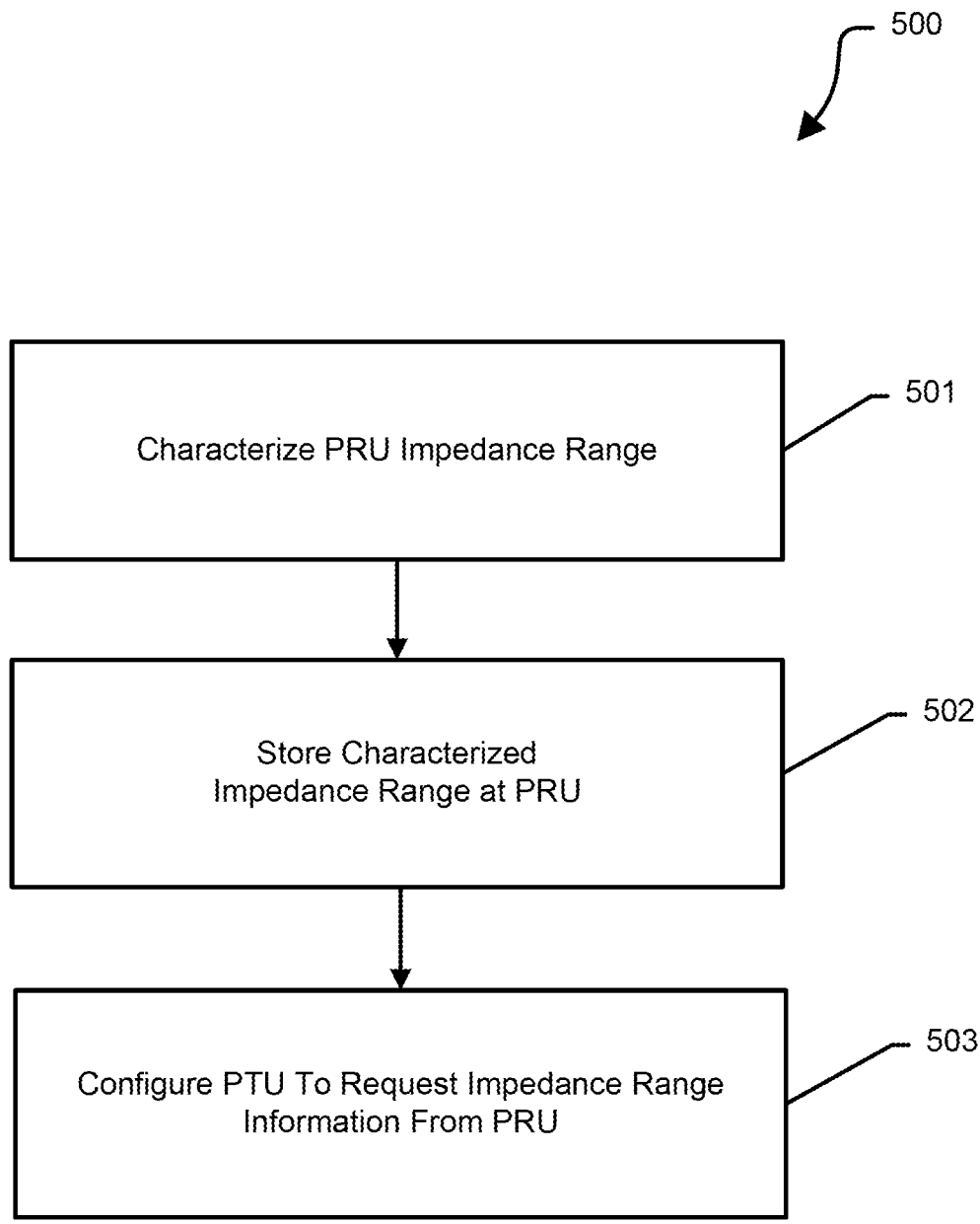
FIG. 5 is a flow diagram illustrating a method for providing impedance range information to a wireless charging device according to a specific embodiment of the present disclosure.

FIG. 5 shows a method 500 for providing impedance range information to a PTU according to a specific embodiment of the present disclosure. Method 500 begins at block 501 where a load impedance of a PRU is characterized. For example, information handling system 150 can be placed on charging pad 110, and PTU 152 or test equipment can measure a load impedance presented by PRU 152. This operation can be repeated across multiple information handling systems to identify variations in load impedance that may occur between particular systems. For example, variations in load impedance can occur due to variations in the electrical properties of components included in PRU 152. The characterization process can further include variations in the positioning of information handling system 100 on the surface of charging pad 110. Method 500 proceeds to block 502 where the characterized impedance range information is stored at a memory device accessible to PRU 152. Method 500 concludes at block 503 where PTU 112 is configured to request impedance range information 160 from PRU 152 and to verify that a load presented to PTU 112 is consistent with received impedance range information 160.

Figure 6:
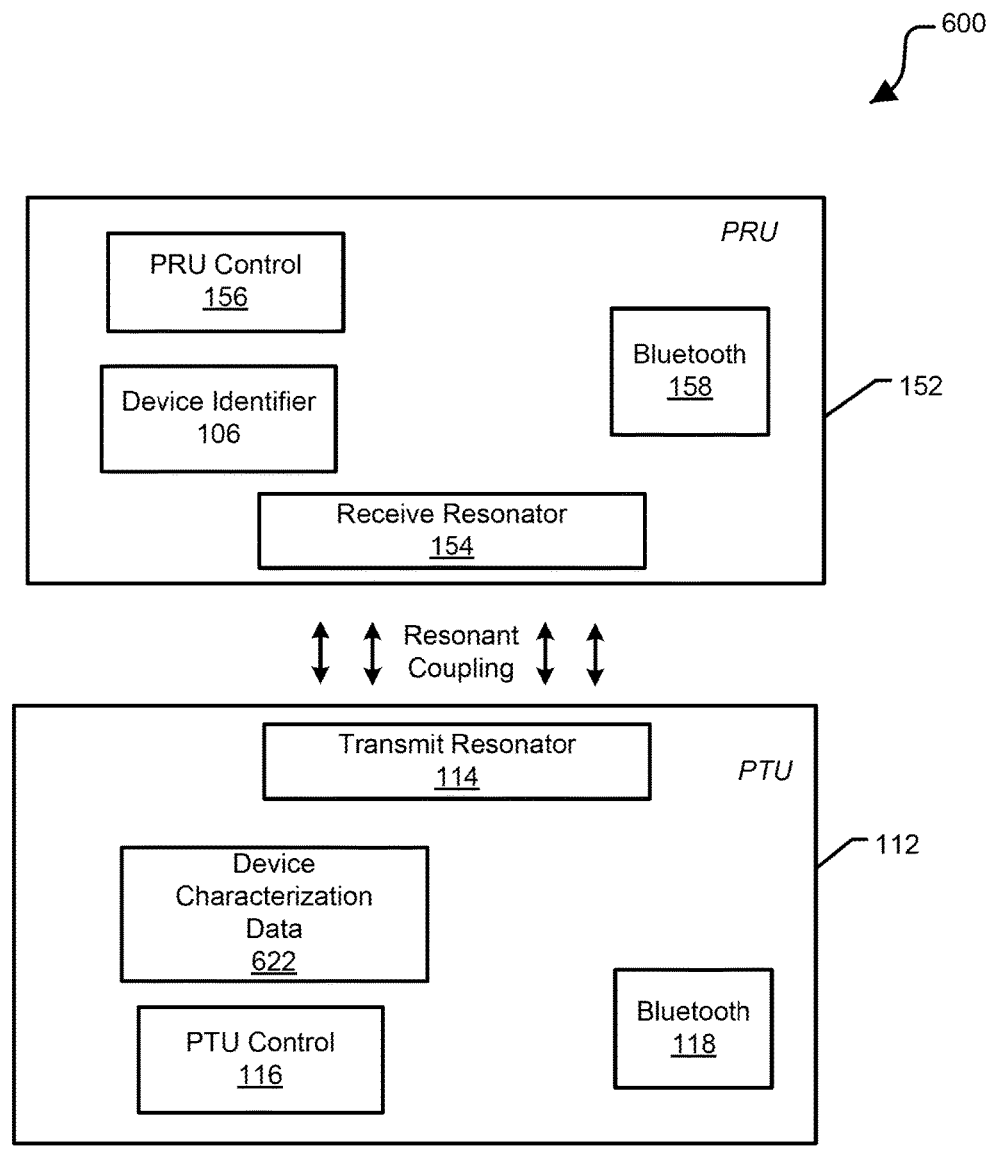
FIG. 6 is a block diagram illustrating a wireless charging system according to another embodiment of the present disclosure.

FIG. 6 shows a wireless charging system 600 according to another specific embodiment of the present disclosure. Wireless charging system 600 includes PTU 112 and PRU 152. PTU 112 includes transmit resonator 114, PTU control circuitry 116, PTU Bluetooth circuitry 118, and device characterization data 622. PRU 152 includes receiver resonator 154, PRU control circuitry 156, PRU Bluetooth circuitry 158, and a device identifier 602. Device identifier 602 includes information identifying the information handling system housing PRU 152. For example, device identifier can include a model number or serial number of information handling system 150. Device characterization data 622 includes one or more entries, each entry identifying a maximum power transmission level corresponding to a specific device identifier.

Device characterization data 622 identifies a maximum power transmission level that maintains compliance with Specific Absorption Rate (SAR) regulations and certifications corresponding to a particular device identifier. Specific Absorption Rate certification is provided by the Federal Communication Commission (FCC) and other regulatory entities, and is a testament that all radiating devices must pass to comply with regulations. SAR testing is done by setting the max current in PTU resonator 114 and then measuring an amount of energy that is radiated while a device that is receiving power is placed on a corresponding charging pad. A portion of the radiated energy can be absorbed by the information handling device, e.g. by an enclosure and other components included therein. For example, a laptop computer can absorb significantly more electromagnetic radiation generated by PTU 112 than can a mobile telephone device because the laptop computer is larger than the telephone, and therefore has more material that prevents excessive levels of radiation from emanating to the environment beyond the laptop. Accordingly, PTU 112 can operate at a greater power level when supplying power to a laptop than can be supplied to a telephone, while being SAR compliant. Different information handling systems may provide varying degrees of absorption based on their size and based on the particular materials used in their manufacture. Device characterization data 622 can be generated in a test environment for each type of device than may be powered by charging pad 110. The characterization data corresponding to one or more information handling systems can be stored at a memory device accessible to PTU 112.

During operation, charging pad 110 receives device identifier 602 from information handling system 110 and adjusts a transmission power level based on the identifier and based on device characterization data 622. In particular, during initial pairing of PTU 112 with PRU 152, and before significant power is provided to PTU resonator 114, PRU 152 can provide device identifier 602 to PTU 112. PTU 112 can either initiate a request to PRU 152 for device identifier 602, or PRU 152 can initiate transfer of device identifier 602 to PTU 112. Once PTU 112 has received device identifier 602 and determined a corresponding maximum transmission power level based on the identifier and based on device characterization data 622, PTU 112 can increase the power transfer level to the identified maximum value and remain compliant with SAR requirements.

Figure 7:
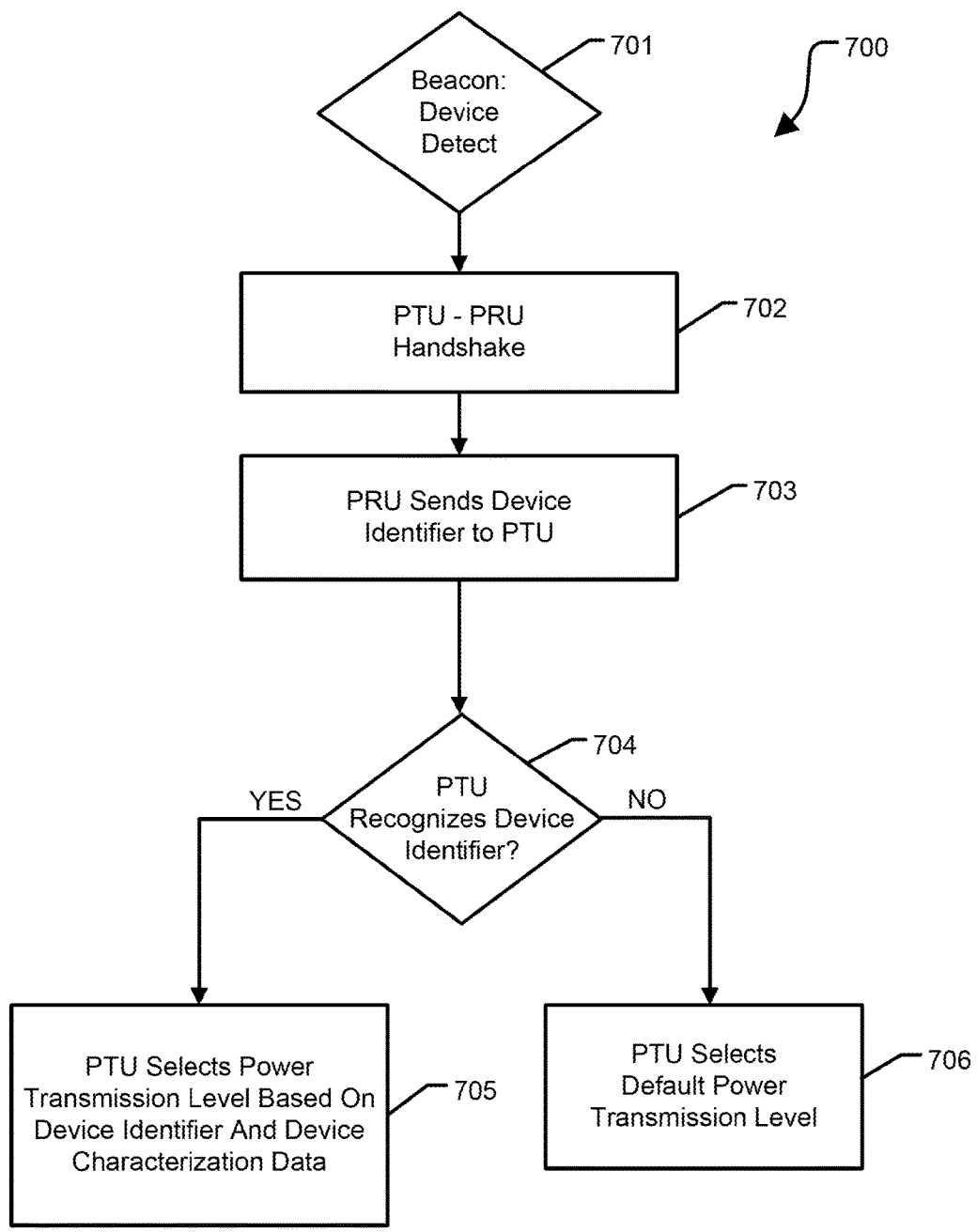
FIG. 7 is a flow diagram illustrating a method for determining a maximum power transmission level at a wireless charging system according to a specific embodiment of the present disclosure.

FIG. 7 shows a method 700 for determining a maximum power transmission level at a wireless charging system according to a specific embodiment of the present disclosure. Method 700 begins at block 701 where a device operable to receive wireless power is detected within range of a wireless power transmission device in response to a beacon protocol performed by the transmission device. For example, wireless charging pad 110 can momentarily activate transmit resonator 114, causing information handling system 150 to respond. The method continues at block 702 where a PTU at the wireless power transmission device and a PRU at the device operable to receive wireless power communicate via a wireless data communication circuitry. For example, PRU 152 can acknowledge reception of a beacon sequence received from charging pad 110 using Bluetooth circuitry 158. Data and configuration settings can be exchanged between PRU 152 and PTU 112 according to protocols of a corresponding wireless power system specification under which PRU 152 and PTU 112 are defined.

Method 700 proceeds to block 703 where the PRU sends a device identifier to the PTU. For example, PRU 152 at information handling system 150 can include a memory device that stores device identifier 602. In an embodiment, PTU 112 can generate a request to PRU 152 to provide identifier 602, the request communicated via the Bluetooth communication link. At decision block 704, PTU 112 determines whether the received device identifier is recognized. For example, PTU 112 can determine whether device characterization data 622 includes an entry associating the received device identifier with a corresponding maximum power transmission level. If the device identifier is recognized, method 700 transitions from decision block 704 to block 705 where PTU 112 selects a power transmission level based on device identifier 602 and based on device characterization data 622. However, if the device identifier is not recognized, method 700 transitions from decision block 704 to block 706 where PTU 112 selects a default power transmission level. The default power transmission level is a power level that is compliant with SAR requirements for any type of information handling system that is coupled to wireless charging pad 110.

Figure 8:
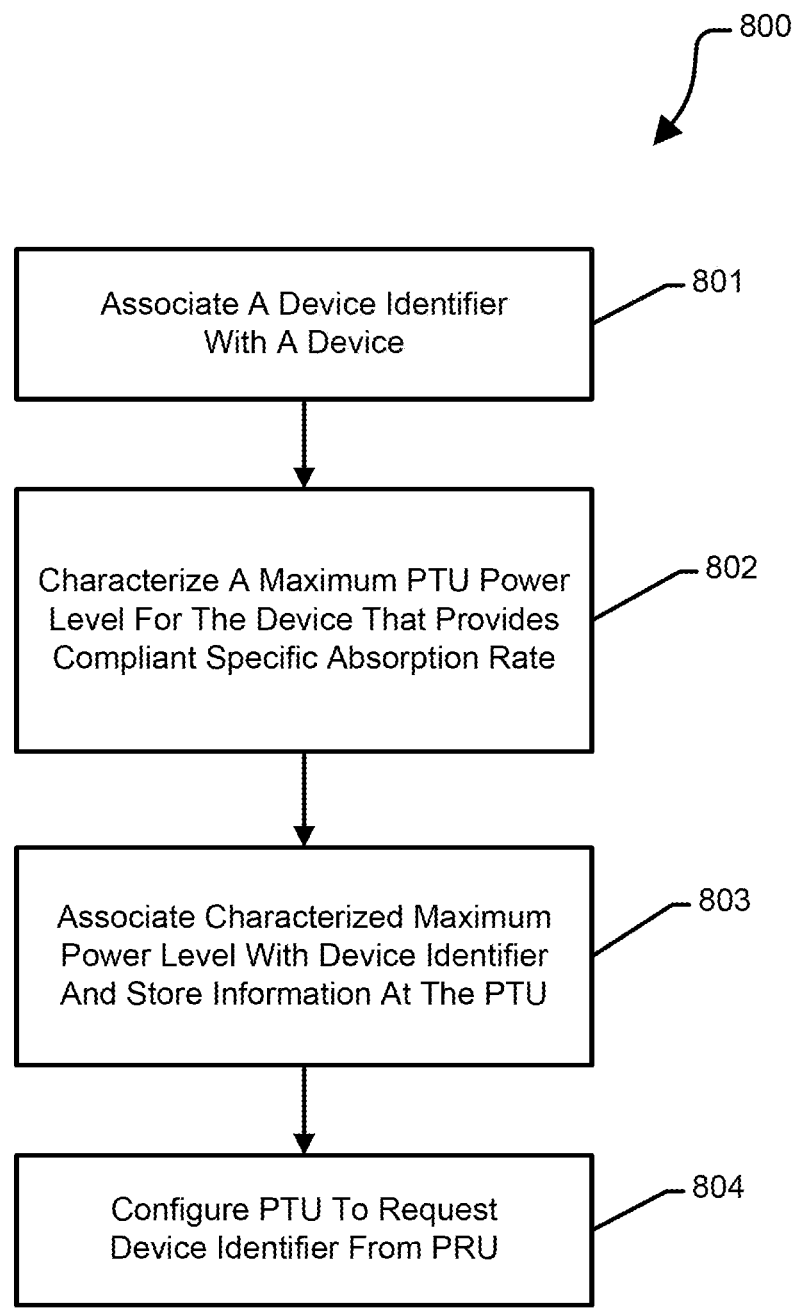
FIG. 8 is a flow diagram illustrating a method for determining a maximum power transmission level at a wireless charging system according to another embodiment of the present disclosure.

FIG. 8 shows a method 800 for determining a maximum power transmission level at a wireless charging system according to another embodiment of the present disclosure. Method 800 begins at block 801 where a device identifier is associated with a device capable of receiving power from a wireless charging pad or another type of wireless power transmission device. For example, a test facility can include equipment configured to monitor electromagnetic radiation and thereby determine compliance with SAR requirements. An information handling system under test is assigned a device identifier, such as a product model number. At block 802, the test facility characterizes a maximum PTU power transmission level that provides SAR compliance. For example, the information handling system can be placed on the charging pad and the power transmission level can be increased while monitoring radiation levels proximate to the charging pad. Method 800 proceeds to block 803 where the characterized maximum power level is associated with the corresponding device identifier and the pairing of the power level and identifier is stored at a memory device accessible to the PTU. For example, a charging pad can include a non-volatile memory device that can store a look up table that includes one or more device identifiers and a corresponding maximum PTU power transmission level corresponding to each device identifier. Method 800 completes at block 804 where the PTU is configured to request a device identifier from a device that is to receive power during initial coupling with the device. The PTU can set a power transmission level based on the received device identifier and based on the characterization data stored at the PTU.

Figure 9:
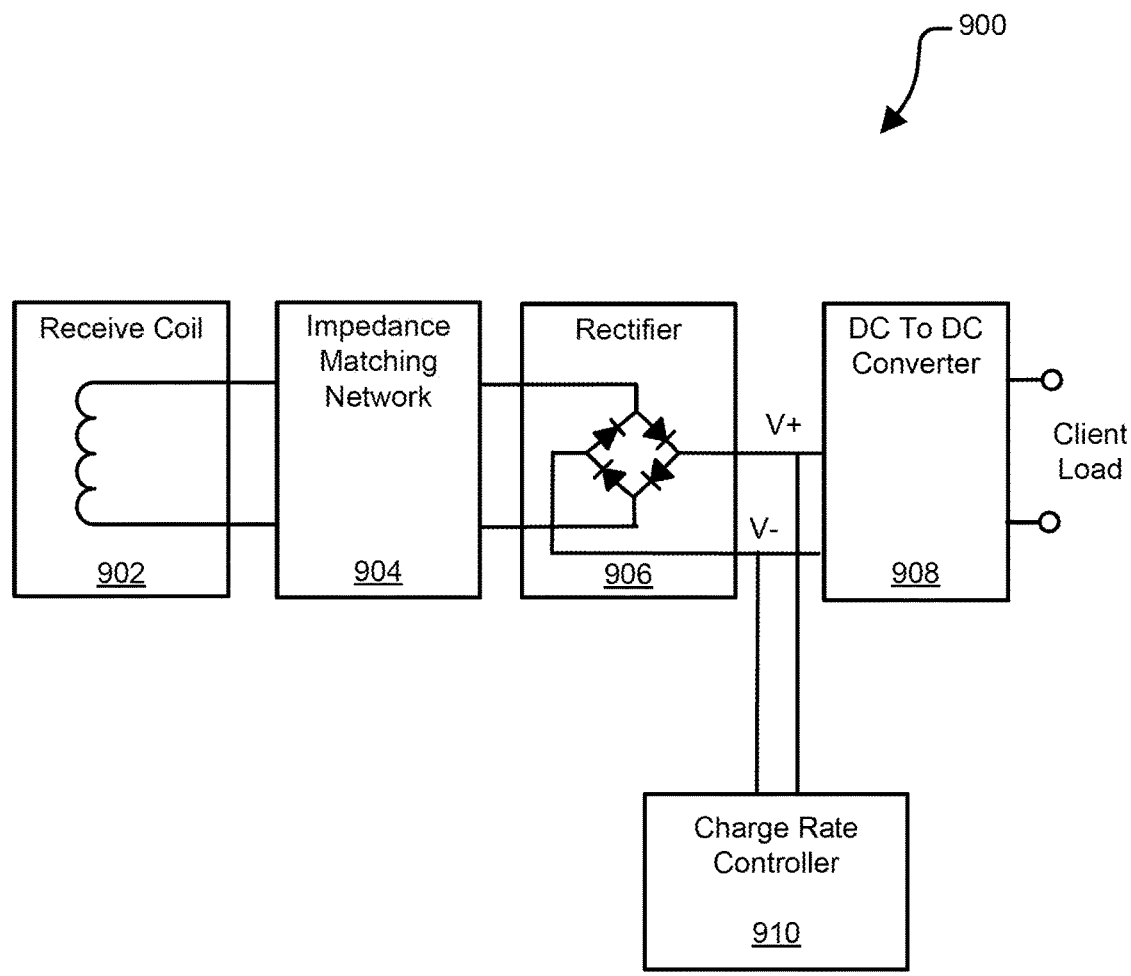
FIG. 9 is a block diagram of a wireless power receiving unit according to a specific embodiment of the present disclosure.

FIG. 9 shows a PRU 900 according to a specific embodiment of the present disclosure. PRU 900 includes a receive coil 902, an impedance matching network 904, a rectifier circuit 906, a DC-to-DC converter 908, and a charge rate controller 910. PRU 900 can be included in an information handling system to receive power wirelessly from a wireless power transmission device, such as a wireless charging pad. Receive coil 902 is typically positioned proximate to a rear surface of the information handling system so as to efficiently couple with an electromagnetic field generated by a PTU, such as PTU 112. Receive coil 902 is an inductor and part of a tuned circuit that can optionally include other components, such as impedance matching network 904. Together, receive coil 902 and impedance matching network 904 provide a resonant circuit that is tuned to the frequency of the signal generated by PTU 112. Rectifier circuit 906 can include a full bridge rectifier or another rectifier topology and is configured to convert the high frequency alternating-current signal received from impedance matching network into a direct current. The direct current provided by rectifier circuit 906 is a supplied to DC-to-DC converter 908, which can increase or decrease the voltage level at the output of rectifier 906 and provide voltage regulation necessary to provide an operating or charging voltage to the information handling system that includes PRU 900. Charge rate controller 910 is coupled to the output of rectifier 906 so as to determine a voltage at the output of rectifier circuit 906.

Charge rate controller 910 is configured to control a power draw of PRU 900 and/or a power transmission level of PTU 112. In particular, charge rate controller 910 uses the voltage level at the output of rectifier 906 to estimate a coupling factor between the PTU resonator and the PRU resonator. The level of the voltage at the output of rectifier 906 can be functionally related to the coupling factor. Furthermore, the coupling factor can be functionally related to a power transfer efficiency of system 100. The functional (mathematical) relationship between rectifier voltage, coupling factor, and power transfer efficiency is typically non-linear and has a positive correlation. For example, an increase in the output voltage of rectifier 906 can correspond to an increase in the coupling factor and a corresponding increase in power transfer efficiency, while a decrease in the output voltage of rectifier 906 can correspond to a decrease in the coupling factor, and a corresponding decrease in power transfer efficiency.

Coupling between a PTU, such as PTU 112, and PRU 900 can depend on alignment and proximity of the PTU resonator to the PRU resonator. As a device that is receiving power is moved further away from the center of PTU inductor 114, the efficiency of the charging system reduces and the thermal impact of the system can increase. For example, as the coupling between the PTU and PRU decreases, a traditional PTU may compensate by increasing its transmission power in an attempt to provide a desired power level to the receive device. The high power level and poor coupling can result in increased current at PRU 900. An increase in current in PRU 900 can increase heating of PRU 900 and the associated information handling system 150 due to $I^2R$ power dissipation at PRU 900. Excessive heat generated by wireless power delivery system 100 may cause information handling system 150 to fail thermal specifications.

In one embodiment, charge rate controller 910 can determine a coupling factor between the PTU resonator and PRU resonator based on the voltage level at the output of rectifier 906, identified as V+ and V− at FIG. 9. Charge rate controller 910 can communicate with PTU 112 using the Bluetooth communication link provided by PRU Bluetooth circuit 158 and PTU Bluetooth circuit 118 to request a desired power transmission level. For example, charge rate controller 910 can determine that excessive heating of information handling system may result due to a reduced coupling factor, as indicated by a corresponding reduction in the voltage provided by rectifier 906. PRU 900 can request that PTU 112 reduce its power transmission level by a predetermined amount. For example, a lookup table can be used to associate various rectifier output voltages with corresponding transmission power levels. Alternatively, or in addition, PRU 900 can adjust operation to reduce its power draw, and thereby mitigate the thermal impact on the system.

Figure 10:
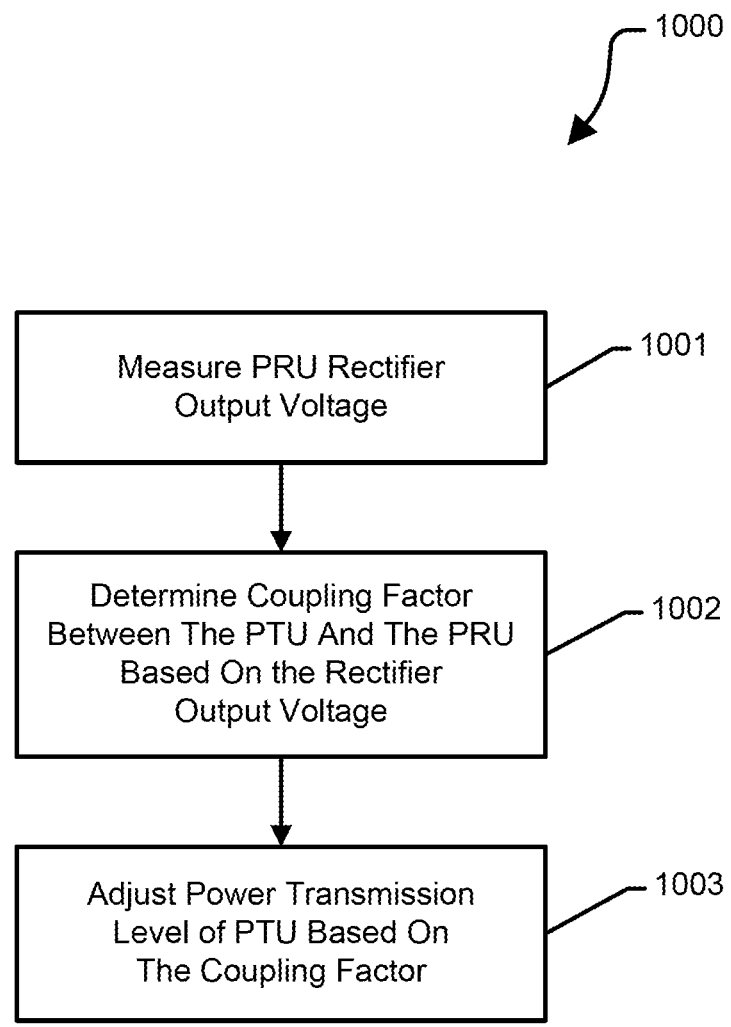
FIG. 10 is a flow diagram illustrating a method for managing thermal requirements at a wireless power transmission system according to a specific embodiment of the present disclosure.

FIG. 10 shows a method 1000 for managing thermal requirements at wireless power transmission system 100 according to a specific embodiment of the present disclosure. Method 1000 begins at block 1001 where an output voltage of a PRU rectifier is measured. For example, charge rate controller 910 can measure a voltage at the output of rectifier 906 during operation of wireless power transmission system 100. The method continues at block 1002 where a coupling factor between the PTU resonator and the PRU resonator can be determined based on the rectifier output voltage. Method 1000 completes at block 1003 where the power transmission rate of system 100 is adjusted based on the determined coupling factor. One of skill will appreciate that the step of determining a coupling factor based on the rectifier voltage is optional, and the power transmission rate of system 100 can be adjusted based directly on the level of the rectifier voltage. Furthermore, the thermal management techniques disclosed in method 1000 can be used in conjunction with other thermal management schemes. For example, thermal sensors can be included at information handling system 150 and/or at charging pad 110 to further determine a power transmission rate of system 100.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    establishing mutual communication between a wireless power transmitting unit (PTU) and a wireless power receiving unit (PRU); and
    receiving at the wireless PTU impedance range information from the wireless PRU.

2. The method of claim 1, further comprising transmitting power to the wireless PRU in response to determining that a load impedance measured at the wireless PTU is within an impedance range specified by the impedance range information.

3. The method of claim 1, further comprising disabling transmission of power to the wireless PRU in response to determining that a load impedance measured at the wireless PTU is not within an impedance range specified by the impedance range information.

4. The method of claim 3, wherein the load impedance measured at the wireless PTU that is not within an impedance range specified by the impedance range information is indicative of a foreign object located within range of the wireless PTU.

5. The method of claim 1, wherein the impedance range information identifies a range of impedance values indicative of proper coupling of a resonator at the wireless PTU to the wireless PRU, the impedance range information determined prior to the PRU receiving power from the PTU.

6. The method of claim 1, wherein the impedance range information includes a two-dimensional range of real and imaginary resistance values.

7. The method of claim 1, wherein the impedance range information is stored at a memory device included at the wireless PRU.

8. The method of claim 1, further comprising:
    characterizing a range of load impedance values of the wireless PRU;
    generating the impedance range information based on the characterized range of load impedance values; and
    storing the impedance range information at a memory device included at the wireless PRU.

9. The method of claim 1, further comprising receiving the impedance range information from the wireless PRU over a wireless communication link established between the wireless PTU and the wireless PRU.

10. The method of claim 1, further comprising configuring the wireless PTU to request the impedance range information from the wireless PRU in response to establishing the mutual communication.

11. A wireless power transmission device comprising:
    a power transmission resonator;
    a controller coupled to the power transmission resonator; and
    a wireless data communication transceiver coupled to the controller, the transceiver to:
        establish communication with a wireless power receiving unit (PRU); and
        receive impedance range information from the wireless PRU.

12. The wireless power transmission device of claim 11, wherein the controller is to:
    measure an impedance of a load coupled to the power transmission resonator; and
    enable transmission of power to the wireless PRU in response to determining that the measured load impedance is within an impedance range specified by the impedance range information.

13. The wireless power transmission device of claim 11, wherein the controller is to:
    measure an impedance of a load coupled to the power transmission resonator; and
    disable transmission of power to the wireless PRU in response to determining that the measured load impedance is not within an impedance range specified by the impedance range information.

14. The wireless power transmission device of claim 13, wherein the load impedance measured at the wireless PTU that is not within an impedance range specified by the impedance range information is indicative of a foreign object located within range of the power transmission resonator.

15. The wireless power transmission device of claim 11, wherein the impedance range information identifies a range of impedance values indicative of proper coupling of the power transmission resonator to the wireless PRU, the impedance range information determined prior to the PRU receiving power from the PTU.

16. The wireless power transmission device of claim 11, wherein the impedance range information includes a two-dimensional range of real and imaginary resistance values.

17. The wireless power transmission device of claim 11, wherein the controller is to request the impedance range information from the wireless PRU in response to the establishing of communication with the wireless PRU.

18. A wireless power system comprising:
    a wireless power receiving unit wireless (PRU); and
    a wireless power transmitting unit (PTU) to:
        establish communication with the wireless PRU; and
        receive impedance range information from the wireless PRU.

19. The wireless power system of claim 18, wherein the wireless PTU is further to:
    measure an impedance of a load coupled to a power transmission resonator included at the wireless PTU;
    enable transmission of power to the wireless PRU in response to determining that the measured load impedance is within an impedance range specified by the impedance range information; and disable transmission of power to the wireless PRU in response to determining that the measured load impedance is not within an impedance range specified by the impedance range information.

20. The wireless power system of claim 19, wherein determining that the measured load impedance is not within an impedance range specified by the impedance range information is indicative of a foreign object located within range of the power transmission resonator.

\* \* \* \* \*